United States Patent [19]
Decotignie et al.

[11] Patent Number: 5,502,571
[45] Date of Patent: Mar. 26, 1996

[54] DEVICE FOR PROCESSING DIGITAL SIGNALS FIRST CODED BY MEANS OF VARIABLE LENGTH CODING AND DEVICE FOR INVERSELY PROCESSING SIGNALS THUS PROCESSED

[75] Inventors: Philippe Decotignie, Paris; Sabine Jourdan, Savigny-Sur-Orge, both of France

[73] Assignee: U.S. Philips Corporation, New York, N.Y.

[21] Appl. No.: 148,109

[22] Filed: Nov. 4, 1993

[30]    Foreign Application Priority Data

Nov. 18, 1992 [FR] France ................................. 92 13855
Jun. 9, 1993 [FR] France ................................. 93 06923

[51] Int. Cl.$^6$ ............................... H04N 5/76; H04N 7/12
[52] U.S. Cl. ................................. 358/335; 348/388
[58] Field of Search ................................. 358/335, 342, 358/310; 348/384, 397, 408, 399, 388; 360/33.1

[56]    References Cited

U.S. PATENT DOCUMENTS

| | | | |
|---|---|---|---|
| 4,907,101 | 3/1990 | Keesen et al. | |
| 5,047,852 | 9/1991 | Hanyu et al. | 348/408 |
| 5,111,292 | 5/1992 | Kuriacose et al. | 358/133 |
| 5,144,425 | 9/1992 | Joseph | 358/133 |
| 5,231,384 | 7/1993 | Kuriacose | 348/388 |

FOREIGN PATENT DOCUMENTS

| | | | |
|---|---|---|---|
| 0482888 | 4/1992 | European Pat. Off. | H04N 5/92 |
| 0501699 | 9/1992 | European Pat. Off. | H04N 7/13 |
| 9102430 | 2/1991 | WIPO . | |

*Primary Examiner*—Tommy P. Chin
*Assistant Examiner*—Robert Chevalier
*Attorney, Agent, or Firm*—Laurie E. Gathman; Leroy Eason

[57]    ABSTRACT

Device for processing digital signals constituted by image blocks and hierarchically arranged types of data. This device comprises an addressable memory (40) for storing said signals, a circuit (10) for counting, per section, the number of bits corresponding in these signals to each type of data, a circuit (20) for assigning, to each of the image sections and in accordance with a given proportion, the number of bits to be transmitted in channels of different priorities, and at the output of said circuits a control circuit (30) for redistributing the bits for each of the sections and in packets of given lengths comprising at least the first bits of a block and possibly the leftover bits of the other blocks. The invention also relates to the device for inverse processing at the receiver end.

7 Claims, 2 Drawing Sheets

DEVICE FOR PROCESSING DIGITAL SIGNALS FIRST CODED BY MEANS OF VARIABLE LENGTH CODING AND DEVICE FOR INVERSELY PROCESSING SIGNALS THUS PROCESSED

BACKGROUND OF THE INVENTION

The invention relates to a device for processing, for transmission and/or storage, digital signals corresponding to a sequence of images and which have first been coded, at least in part, in accordance with a variable length coding method, said signals being constituted by image blocks of an intergral number M of types of data which can be arranged in accordance with a given hierarchy. The invention also relates to a device for inversely processing such signals before they are decoded, after the digital signals have already been processed as described and subsequently transmitted and/or stored. The invention may be used, for example 1 in the field of transmitting animated images and particularly television images.

A standard referred to as MPEG1 has recently been adopted by the "Moving Picture Expert Group" (MPEG) of the international standardization organization I.S.O for storing digital animated images. This standard defines a very efficient coding process for recording non-interlaced images in the CIF format (Common Intermediate Format, 288 lines×352 pixels/line, 25 Hz, 1:1) but can also be used for any other image format. The coding methods which are compatible with said standard allow, for example compression of a digital television signal of 160 Mbits/s to 5 Mbits/s, i.e. in a ratio of 32/1, while preserving a very satisfactory image quality.

In current research it has been attempted to ascertain whether this standard may also be used for transmitting images and, for example and, television images. Unfortunately, the answer seems to be negative at the moment because of the Variable Length Coding (VLC) technique which is used for the MPEG1 standard and is associated with an orthogonal transform referred to as Discrete Cosine Transform (DCT) with which the spatial redundance of the image can be reduced. When a transmission error influences a bit of the digital data stream obtained after VLC coding, the decoder receives a code word whose length appears to be different from that of the transmitted code word, which the decoder does not recognize and so it no longer has a temporal reference for locating the start of the next code word. The result is that the subsequent code word is decoded in an erroneous manner and also the following code words are decoded erroneously; i.e., the error propagates. All the data decoded after the location of the first error are false until a new reference point constituted by a synchronization word has not appeared. As the latter are very numerous (for example, one in every 16 lines of the image), even a very weak error rate contributes to unacceptable image faults, due to propagation of these errors. There are techniques for reducing the error rate to very low values, making use of very powerful error correction codes, but these techniques increase the redundancy of the signals, which runs counter to the objective pursued by MPEG1.

Another technique with which, instead of correcting the error(s), the propagation of errors can be limited, is described in U.S. Pat. No. 4,907,101. The solution proposed in this document is that, based on the tact that each coded block contains a variable number of code words of different lengths, a packet (or unit) of a given capacity which is equal to the average length B of the blocks between two successive synchronization words (i.e. in an image section) is defined and that at least the first bits of a block in this packet are transmitted. If a block is shorter than this packet, the leftover bit locations will remain in this packet. If, in contrast, a block is longer than the packet, the leftover bits are placed in the locations which have been left available by the short blocks. Thus, all the packets of the transmitted bits have an equal length (with the possible exception of the last packet, because the total number of bits of a section is not generally equal to a multiple of the number of blocks) and during decoding synchronization can be based on the marking of the starts of the packets of bits corresponding to each block. Thus, synchronization no longer poses any problem. Even if one or several of these blocks are beset with transmission errors, these errors can no longer propagate to other blocks.

Unfortunately, this technique is not satisfactory because it cannot be applied to an assembly of different information components such as are present in an MPEG1 data stream. In fact, it will hereinafter be evident that for the quality of the image certain ones of these information components are more important than the information components of the block itself, and their loss may impede the whole decoding process at the receiver end. Moreover, the majority of these information components are coded in a differential manner, i.e. a prediction technique is used which is based on similar information components present in the previous blocks (by coding the difference between the previous information component and the current information component) and every error in a block discontinues to propagate because of this relation to the previous information components.

SUMMARY OF THE INVENTION

A first object of the invention is to provide a device for processing digital signals which are of different lengths and thus have a variable importance justifying their arrangement in accordance with a given hierarchy, in which the propagation of errors is limited in spite of the existence of a prior variable length coding of these signals and without increasing the degree of redundancy of information components contained in these signals.

To this end the invention relates to a device as defined in the opening paragraph and which is characterized in that it comprises:

(1) an addressable memory for storing the stream of bits of a digital signal which has been coded by variable length coding;

(2) a counting circuit also receiving said bit stream in order to determine and store the number of bits in said stream corresponding to each type of data in at least one image section, a section being defined as a whole sub-assembly of data blocks which is preceded by a synchronizing signal;

(3) at the output of the counting circuit, a bit allocation circuit for assigning to each image section, and in accordance with a given proportion to be roughly taken into account in an image or in a group of images, the number of bits to be transmitted and/or stored in each of a number N of channels of different priorities, these N numbers of bits being referred to as allocations;

(4) at the output of the channel bit allocation circuit, a circuit for controlling the redistribution of bits of said stream for each image section and in accordance with the following process:

(a) as a function of the value of the channel bit allocation corresponding to the highest priority, assigning, to the corresponding channel, in descending hierarchical order, all those data which can be entirely comprised in such allocation;

(b) as a function of the value of the channel bit allocation corresponding to the lowest priority, assigning to the corresponding channel, in an ascending hierarchical order, all those data which can be entirely comprised in such allocation;

(c) for the data thus assigned, and for the sub-assembly of blocks of the section concerned, calculating in numbers of bits the average length per block for defining a specific unit length of a transmission packet for each type of data;

(d) for the type of data which cannot exclusively be assigned to either the channel of the highest or the lowest priority, assigning to the channel of highest priority those of such data which can be comprised therein by an equal distribution in the sections, and a subsequent complementary assignment of the remainder of such data in the channel(s) of lower priority;

(e) for this type of data, which is not exclusively assigned but is distributed between at least two channels, a similar calculation of the average length per block is made for also defining a specific unit length; said assignment values and said average lengths being applied to the addressable memory for the purpose of reading such memory in conformity with said process of redistribution per channel and, for each channel, per packet of data of the same type constituting the units having a length equal to said respective average lengths, said process of redistribution per channel and per packet locates at least the first bits related to the relevant type of hierarchical data in each packet and the leftover bits of another block or the other blocks in the possible complementary location remaining available.

The processing device thus proposed succeeds in reconciling the following contradictory situations. On the one hand, the sequence of signals concerned here contains various information components of which certain ones are more important than others and for which the errors relating to their identification have more serious consequences in the matter of propagation of transmission errors, which would justify their coding and processing in a more careful manner than the other information components. However, on the other hand the data are decoded in a manner which is more secure as the marking of positions of various information components in the coded signals is simpler. The technical solution used in this case for transmitting and/or storing data, which can be arranged in accordance with a given hierarchy, ensures the distribution of these data independent of their mutual and often very variable proportions in an effective and very reliable manner as regards the subsequent restitution of the positions of said information components.

International Patent Application WO-91/02430 describes a system for different importance. However, this document does not have for its object to process the signals by taking the less important part of a particular characteristic of the information components. Simply by breaking the initial relationship of the data with successive data blocks, they are regrouped per data type to form a series of blocks constituting superblocks, and then a basic principle identical to that described in the above-referenced U.S. Pat. No. 4,907,101 is applied to the new arrangement thus constituted. The subsequent decoding will then have a considerably greater complexity and without this resulting, in the course of decoding, in a guarantee of the security of restoring those data which may have priority because they are more important for the final image quality (as, for example, within the scope of the Application mentioned hereinbefore).

In a particular embodiment of this device, corresponding to processing a bit stream of the MPEG type, the signals are constituted by $M=3$ types of data, each type to be transmitted and/or stored in $N=2$ different channels HP and LP having a high and a low priority, respectively.

In a more complete embodiment of the device, the possible results of the redistribution realised by calculating the average lengths per block and for each of the two HP and LP channels are taken into account according to the invention. For this purpose the process of redistribution carried out in the control circuit for redistributing the bits also comprises a stage for calculating the average length per block and per channel for the assembly of leftover bits after regrouping these according to these results.

The capacity of said addressable memory is preferably sufficient to store the image or the group of images for which a given global proportion is to be taken into account, but in a modification which is slightly simpler and permits of reducing the memory size, it is possible to store the counting values which have been determined for the image or for the previous group of images. The capacity of the memory may then be equal only to the size of an image section.

It is another object of the invention to provide a processing device which, for signals transmitted and/or stored after being subjected, subsequent to variable length coding, to a processing operation as described hereinbefore, is suitable for inverse processing of these signals before they are variable-length decoded.

To this end the invention relates to a processing device which is characterized in that it comprises:

(1) a circuit for switching the transmitted and/or stored signals after this temporary reorganization;

(2) connected in parallel to N outputs of said switching circuit, N data memories corresponding to each of the N channels, respectively;

(3) an intermediate memory for storing the bits corresponding to said gaps;

(4) parallel to each of these (N+1) memories, M memories for the M-type of data;

(5) connected to the output of each of these M memories, a switch for alternately selecting one of such outputs of and thus form the initial stream of digital signals, M and N being preferably being equal to 3 and 2, respectively.

The processing device thus proposed ensures the reception of digital signals which have been coded and subsequently processed and then switched in accordance with the types of data therein.

These and other aspects of the invention will be apparent from and elucidated with reference to the embodiments described hereinafter.

DETAILED DESCRIPTION OF PREFERRED EMBODIMENTS OF THE INVENTION

Figure 1:
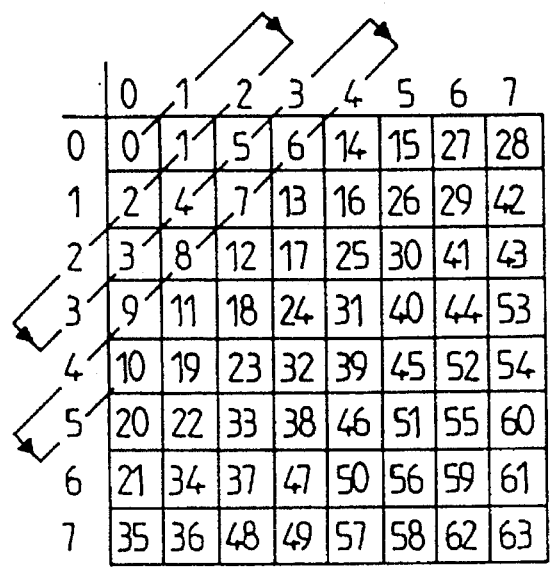
FIG. 1 illustrates a zigzag scanning of the coefficients resulting from a DCT transform applied to a block of 8×8 pixels.

Before describing these embodiments of the devices according to the invention, it should be noted that they are directed to processing data of the MPEG type and it will thus be necessary to recall the characteristics of a data stream in conformity with this standard.

A digital sequence of animated images comprises data relating to the luminance component Y, as well as data relating to the chrominance components such as or colour difference signals U and V. The grey levels for the luminance Y and the colour levels for the signals U and V are expressed by digital words of 8 bits, which words are grouped in matrices. In accordance with the MPEG1 standard the input format is such that the chrominance is subjected to a sub-sampling by four with respect to the luminance. Consequently, there are two values connected with colour (one for U, the other for V) for every four luminance values. As the word matrices are divided into blocks of 8×8 pixels, four adjacent blocks of the matrix Y correspond to one block of the matrix U and to one block of the matrix V and these six blocks jointly constitute a macroblock (MB). These blocks and macroblocks are the image subdivision units on which the coding operation is performed. Finally, the regrouping of a series of macroblocks constitutes a section and each image is composed of a given number of sections, for example 36 in the example described.

The images themselves are of three types in accordance with the coding mode applied to them: the images I (or intraframe) coded images which are coded independently of any other image, the images P, or predictive coded images which are predicted by unidirectional motion compensation based on preceding or subsequent images (of the type I, or of the type P) and the images B, or bidirectionally motion-compensated images predicted by bidirectional motion compensation based on a previous image and a subsequent image (of the type I and/or P). Several associated images constitute a group of images (or GOP, Group Of Pictures) in which the images are arranged, for the transmission, in the order in which the decoder is to decode the images I, P, B. The reorganization of these images in their natural order does not take place until after decoding. Finally, several groups of images constitute in their turn a sequence of images.

A pixel of an image is generally similar to its surroundings (i.e. to the pixels which surround it). With a view to the envisaged transmission and/or storage, this spatial redundance may be reduced by using the statistical properties of the images in the frequency domain with the aid of two conventional techniques referred to above and jointly used, viz. Discrete Cosine Transform DCT and Variable Length Coding VLC. The DCT transform converts each block of pixels into a block of coefficients, the first of which, the direct coefficient (DC) represents the average value of the grey level throughout the block and the others, the alternating coefficients (AC) successively represent the different increasing picture frequencies in the block. These coefficients are quantized with a quantizing step conditioning the precision of their reconstitution upon decoding (the high frequencies are less perceptible to the human eye, which justifies a larger quantization step) and are subsequently read in accordance with a given scanning mode, generally a zigzag mode.

FIG. 1 illustrates this example of the scanning mode: a number corresponding to the order in which the coefficients will be coded (here 0 for the direct coefficient DC and 1 to 63 for the AC coefficients) is attributed to each coefficient (64 in a block of 8×8 pixels). This order of coefficients corresponds to their importance in accordance with a psychovisual criterion related to the spatial frequencies in the block. The sensitivity of the human eye decreases when the spatial frequency of the structures in the image increases. The first coefficient in the position 0 corresponds to a uniform structure of the block and the coefficients of the lines and columns correspond from left to right to increasing horizontal spatial frequencies and from top to bottom to increasing vertical spatial frequencies. This reading of the coefficients, in the direction of the arrows shown in FIG. 1, is followed by the VLC coding which uses the shortest code words for the symbols to be coded most frequently and the longest code words for the symbols to be coded least frequently (and thus contributes to an average code word length which is less than the length in the case of a fixed length coding technique).

Within a sequence of images a given image also often shows similarities with images which surround it. This temporal redundance justifies the use of an image for prediction of another image: as has been described above, the first image is normally coded (intra-image I), i.e. independently of any other image but subsequently only the difference between the pixels of the two different images is coded (predicted images P or B). The choice between the different types of possible prediction is made on the basis of the result of a motion estimation of the objects contained in the images, which estimation is carried out at the level of the macroblocks: thus intra-image macroblocks (because they are coded in an autonomous manner) or predicted macroblocks are available. An intra-image I only comprises intra-macroblocks and allows an autonomous decoding without reference to other images of the sequence. A predicted image of the type P only comprises intra-macroblocks or predicted macroblocks based on information components contained in a previous image (macroblocks P). A predicted image of the type B contains any type of macroblock (intra-macroblock or predicted macroblock based on a previous image or based on a subsequent image, or predicted with the aid of a bidirectional interpolation between a previous image and a subsequent image).

Figure 2:
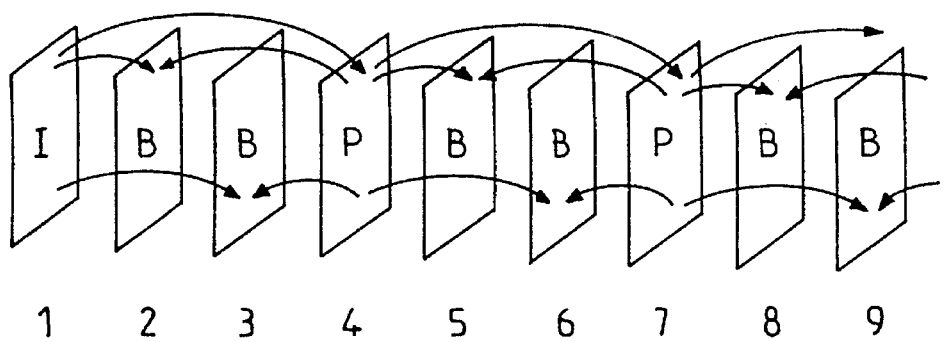
FIG. 2 shows an example of a sequence of different images in accordance with the coding mode adopted for each sequence, these coding modes being intracoding, denoted I, monodirectional predictive coding, denoted P and bidirectional coding, denoted B.

FIG. 2 shows an example of a succession of coded images of the type I, P, B displayed (as defined above, with the order of transmission being different from the natural order of display shown under these images, which provides the possibility of decoding the images P required for decoding the images B preceding them in the natural order of display). The prediction is effected, for example, by searching the correlation between the block of the current image and one of the blocks present in a search window defined in the previous and/or subsequent reference image associated with this current image, the block retained in said reference image being the one which gives the best correlation. The arrows in FIG. 2 indicate from which image(s) an image P or B is predicted in the example described.

A data stream MPEG thus comprises six levels of information, each level including the low level and some additional information components. The highest level corresponds to a sequence of images which and with a header comprising the information components required for decoding the sequence (starting code of the sequence, format, image rhythm, bit rhythm, memory size, quantizing matrices) and ends with an end of sequence code.

At the low level the group of images GOP comprises an arbitrary number of images at least one of which is image I. Although this is not absolutely necessary, each GOP may be autonomous (it then starts with an image I and ends with an image I or P) and may be decoded independently of any previous or subsequent image. Moreover, the succession of images I, P, B is often periodical, as in the case of the example of FIG. 2, but this is neither absolutely necessary. Each GOP contains a header followed by a certain number of images. This header marks the start of the GOP and contains additional information: starting code of the GOP, duration of the first displayed image of the GOP, indication of the autonomous coding of the GOP, etc. It has been seen above that the order of transmission of the images of a GOP is generally not the natural order of the images before coding or after decoding.

The low level which corresponds to the image includes an image header followed by a given number of image sections. The image header marks the start of the image and contains additional information: starting code of the image, temporal reference of the image, type of image (I, P, B) and other codes or indicators.

The low level corresponds to the image section and includes a section header followed by a certain number of macroblocks. The header marks the start of the section and contains additional information: starting code of the section, quantization step of the DCT coefficients, etc.

Only the four higher levels which have been numbered contain synchronizing data. This synchronization is ensured each time by a starting code, in this case having a length of 32 bits, comprising the synchronizing word itself (24 bits) and eight level indicator bits (sequence, GOP, image, section). Each synchronizing word is unique for eliminating any risk of confusion during decoding.

At the next low level, which corresponds to the macroblock, a macroblock header followed by a certain number of blocks is found, in this case 6 at a maximum (a macroblock normally contains six blocks, as stated above, but every block all of whose coefficients are zero is not transmitted). This header also contains some additional information such as the address of the macroblock (so as to know its position), its type (for indicating its coding mode: intracoding, monodirectional prediction coding, bidirectional prediction coding), quantization factor, existence or absence of an associated motion vector, motion vector, if necessary, indication of those blocks which are coded in the macroblock, etc.

The last level is that of the blocks which represent sections of 8×8 pixels of the luminance matrix or of the chrominance matrices. As has been stated, each block is subjected to a DCT transform which converts this block into a block of coefficients (DC coefficient and AC coefficients). Like the macroblocks, the blocks are of the intra type (and thus always start with a DC coefficient) or of the predicted type (and in this case they comprise at least a non-zero AC coefficient, if not they are not coded) in accordance with their coding mode. The coding of the coefficients themselves is different for the DC coefficients and the AC coefficients. For the DC coefficients the code word translates the difference between the DC coefficient of the current block and the DC coefficient of the previous coded block (this previous DC coefficient of the block is thus utilized at the prediction ends, both for luminance and for chrominance). For the AC coefficients there is no differential coding: the code word systematically comprises a range of variable length zeros followed by the absolute value of the first non-zero coefficient and subsequently by the bit signifying the sign of this coefficient. Each block ends with an end of block code as soon as all the subsequent coefficients are zero.

With this recall of the characteristics of the MPEG1 standard being realised, the actual invention can now be further described. The previous study has emphasized that certain MPEG1 data are more important than others. For example, MPEG 1 uses a motion-compensated image prediction. The motion vectors describing the motion of the blocks are therefore essential information components whose loss contributes to very visible artefacts in the image; e.g., the displacement of entire macroblocks. An error in the DC coefficients involves a change of the complete colour of a block or of a macroblock. The motion vectors and the DC coefficients coded in a differential manner are also very sensitive to the propagation of errors. Because of the technique of temporal prediction between images, errors in the images of the type I or P repeat themselves in those of the type B until a new image I has occurred.

The technical solution which will now be described takes account of this variable importance of several data, the hierarchy between them (here three types of essential data), and creates several levels of protecting information grouped in hierarchy classes (two in the example described hereinafter). The data thus protected in a specific manner are subsequently transmitted and/or stored, for example, after multiplexing. However, before describing the processing device with which this solution is carried into effect, the essential stages of the process will be described.

The first of these stages consists of examining and sorting the MPEG1 information components as to their descending degree of importance:

the headers of the high levels;

the headers of the macroblock;

the DC coefficients;

the AC coefficients.

Among these information components, the headers, the motion vectors (which are part of the headers of the macroblock) and the DC coefficients are sufficient for reconstructing an image which is extremely concise and although weak in esthetics is nevertheless recognizable when compared with the original image. Different trials and statistical tests have shown that in a group of images COP these data generally use no more than 30% of the overall rate, a percentage which, in the description hereinafter, will constitute the basis for distributing the overall rate between a high-priority transmission channel (denoted HP) and a low-priority transmission channel (denoted LP).

The second stage comprises the realisation, within a group of images GOP, of a local modification of the distribution of the data rate between the HP and LP channels. In the images of the type B the headers of the macroblocks often occupy more than 50% of the rate but only about 5% or even less in the type I images. A local distribution of the rate is thus possible while maintaining the average proportion equal to 30% in the total GOP. This local adaptation of the distribution, which attempts to favour the most important information components in accordance with the established given hierarchy, is effected in each section; because the rate varies enormously from section to section. For example, the intra-image sections comprise a much larger number of AC coefficients than the predicted image sections.

Figure 3:
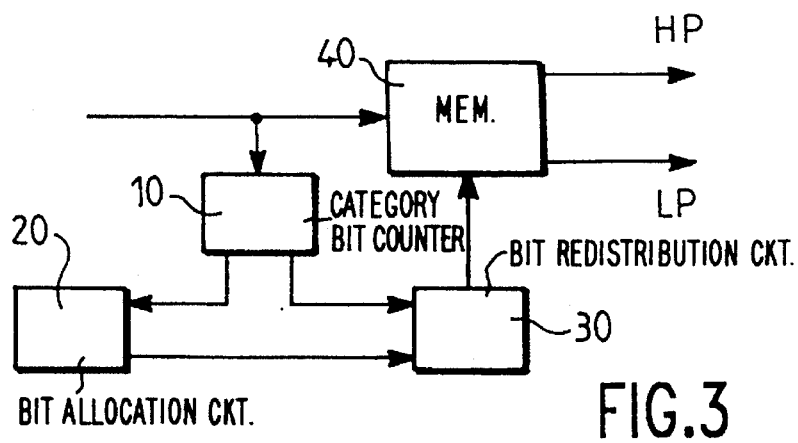
FIG. 3 shows an embodiment of a processing device according to the invention for processing the coded image signals before transmission and/or storage thereof.

These stages are carried into effect by means of the processing device shown in FIG. 3. This device comprises a counting circuit 10 which receives, from the stream of digital data, successively each group of images GOP and determines and then stores in memory the number of bits used by each category of data in each section of this GOP. These digital data are stored in an addressable memory 40. Two situations may then arise, the second of which occurs less frequently:

(a) for the total number of sections of the GOP, the global number of bits corresponding to the section and macroblock headers and to the DC coefficients remains smaller than the number of bits which corresponds to the HP allocation (as hereinafter referred to for the "high-priority" number of bits) and the LP allocation (referred to as the "low-priority" number of bits which is complementary with respect to the total number of bits of a GOP).

(b) the global number of bits corresponding to the section and macroblock headers and to the DC coefficients is higher than the HP allocation of the GOP, and the leftover bits may be incorporated in the LP allocation and transmitted by the LP channel.

The determination effected by the circuit 10 is important. The assignment of the bits to be transmitted in the HP or LP channel is realised in different manners dependent on the result of this determination. In the case of the situation (a) described above, the total number of most important information components may be transmitted in the HP channel and the HP assignment of each section is the following:

the exact total number of bits needed for HP transmission of the section and macroblock headers and DC coefficients assigned to each section;

the total number of bits thus allocated for all the sections is subtracted from the global HP allocation per GOP, and the number of leftover bits thus obtained (or residual HP allocation) is utilized jointly with the total number of global LP allocation per GOP for the transmission of all the remaining bits which correspond to AC coefficients. The HP or LP assignment of these remaining bits is realised by distributing the residual HP allocation among the total number of sections of the GOP, however, with a priority for the sections associated with intra images I (because these images I basically serve for predicting the predicted images P or B and should thus be the least possibly affected by transmission errors). If the residual HP allocation is sufficient for assigning the total number of bits associated with the intra image sections I and if there is still a residual HP allocation, the latter is this time intended for the bits of the sections associated with the predicted images of the type P and subsequently, if there is still place left, to the bits of the sections associated with the predicted images of the type B. If, in contrast, the residual HP allocation is smaller than the total number of bits corresponding to the sections I, this allocation is distributed among all of said sections I and the non-allocated bits of these sections I receive an LP assignment, similarly as the total number of remaining bits.

If contrary to the situation (b), the total number of most important information components cannot not be entirely transmitted in the HP channel, the leftover fraction will have to be transmitted in the LP channel. For the sake of simplifying the assignment, the process of realising this assignment is inverse to the previous process:

the exact total number of bits needed for LP transmission of the least significant information components (the AC coefficients) is assigned to each section;

the total number of bits thus allocated for all the sections is subtracted from the global LP allocation per GOP and the number of residual bits thus obtained (or residual LP allocation) is utilized jointly with the total number of global HP allocation per GOP for the transmission of all the remaining bits which correspond to the section and macroblock headers and to the DC coefficients. Here again the LP or HP assignment of these remaining bits is realised by distributing the residual LP allocation among the total number of sections of the GOP with a priority for the sections B, and subsequently P which, to a lesser extent than the I sections, are jeopardized by transmission errors. If the residual LP allocation is sufficient for assigning the total number of bits associated with the sections B, and subsequently P and if there is still a residual LP allocation, the latter allocation is intended for bits of the sections associated with the I images. If, in contrast, the residual LP allocation is smaller than the total number of bits of the sections B and P, this allocation is distributed among all of said sections B and P and the non-allocated bits of these sections B and P receive a HP assignment, similarly as the total number of remaining bits.

In summary, the counting circuit 10 provides for determining and storing in memory the total number $N_T(GOP)$ of bits corresponding to a COP, the number $N_S(MBK)$ of macroblocks in each section of this GOP, and the number of bits corresponding to each section and utilized for each category of data: $N_S(HDR)$ for the section headers, $N_S(OVH)$ for the macroblock headers, $N_S(DCS)$ for the DC coefficients and $N_S(ACS)$ for the AC coefficients. An allocation circuit 20 arranged at the output of circuit 10 permits of realising the assembly of assignments of bits to the HP and LP channels, whose principle is described above, and of memorizing, notably in view of their transmission and/or storage required for the markings during the inverse processing at the receiver end, the number of bits corresponding to these assignments per section: N(HHP) and N(HLP) for the section headers, N(VHP) and N(VLP) for the macroblock headers, N(DHP) and N(DLP) for the DC coefficients, and N(AHP) and N(ALP) for the AC coefficients (HP and LP always designating the HP channel and the LP channel, respectively, in these notations).

When these numbers are known and memorized, the next stage consists of redistributing the order of the bits of each GOP section. This redistribution is defined by a mixing control circuit 30 arranged at the output of the circuits 10 and 20 and controlling the reading of the addressable memory 40 in an order which is different from the order in which the data arrive and is thus different from the writing process. This circuit 30 operates per section and subsequently, via a loop after processing of a section, permits of successively operating for all the GOP sections. Said processing operation will be described only for a single section.

The following principle is used for this mixing treatment of a section. For each of the information components previously indexed in a descending order of importance and in each of the two HP and LP channels, transmission packets of a given length equal to the average length of the information components per block in an image section are defined. Per block, at least the first bits relating to this information concerned are transmitted. If for this block the bits relating to said information occupy less space than is available in the packet, there will be space available in this packet, (which space is referred to as a gap) and these possible available spaces are used to accommodate the leftover bits which, for one block, are not comprised in the packet. Thus, as a function of the adopted HP-LP distribution and of the allocations realised by the circuit 20, a redistribution (or mixing) of the bits of each section is organized for optimally refilling the packets corresponding to each type of information components.

This redistribution may be effected by way of preliminary tests, taking into account various situations which may occur as a function of previously determined allocation values. In the embodiment described, four particular situations are distinguished which will be successively described hereinafter.

In the first of these situations, which is generally the most frequent situation, the allocated number of HP bits (=HP allocation) is higher than the sum of the actual number of bits $N_S(HDR)$, $N_S(OVH)$ and $N_S(DCS)$ (for the section headers, macroblock headers and DC coefficients, respectively). In a manner comparable to that mentioned previously with reference to the patent U.S. Pat. No. 4,907,101 cited above, a HP unit of the macroblock headers is defined which has a length which is equal to the average length of said macroblock headers for the whole section. Subsequently, a HP unit of DC coefficients having a length which is equal to the average length of said DC coefficients for the whole section is defined in an autonomous manner. The residual HP allocation is finally distributed in an equal manner among the AC coefficients, which defines a HP unit of AC coefficients having a length which is equal to this residual HP allocation divided by the number of blocks of the section. For the residual AC coefficients, the division of the number of corresponding bits by the number of blocks in the section similarly defines a LP unit of AC coefficients. In this respect it is to be noted that the divisions with which the lengths of the units can be calculated most often comprise rests and that the length in number of bits of these rests must be transmitted in a manner which will be described hereinafter.

In the second of the situations mentioned above, the number of HP bits, or HP allocation is smaller than the sum $N_S(HDR)+N_S(OVH)+N_S(DCS)$ but is higher than $N_S(HDR)+N_S(OVH)$ (section header+macroblock headers). Similarly, for each type of dam which may be completely assigned to the HP channel (section headers and macroblock headers) or to the LP channel (the AC coefficients) an associated average length is defined which defines a unit of fixed length and subsequently, for those data which must be distributed among these two channels (the DC coefficients), first the average length associated with the HP channel and then that associated with the LP channel, these two last-mentioned lengths similarly defining a corresponding fixed-length unit.

In the third of the above-mentioned situations the HP allocation is smaller than the sum $N_S(HDR)+N_S(OVH)$, but is higher than $N_S(HDR)$ (header of the single section). Here again the average lengths, or fixed-length units, are defined for each data type (here the AC and DC coefficients) which may be assigned to one of the HP or LP channels (here the LP channel for the AC and DC coefficients) and subsequently, for those data which must be distributed among the two channels (the macroblock headers), first the average length associated with the HP channel and then that associated with the LP channel, these two last-mentioned lengths similarly defining a corresponding fixed-length unit.

The fourth of the situations summed up will be mentioned as a reminder, in which situation the HP allocation is insufficient to permit the transmission of the section header. This situation no longer provides the possibility of realising the principles of distribution in HP or LP units: a turn in the situation is concerned in which the device assumes another mode of operation which is different from that according to the invention, for example that described in the above-cited patent U.S. Pat. No. 4,907,101. In this case the HP and LP data are transmitted, after reading in an addressable memory 40, to a multiplexing circuit 50 at whose output the transmission and/or storage may be realised.

Figure 4:
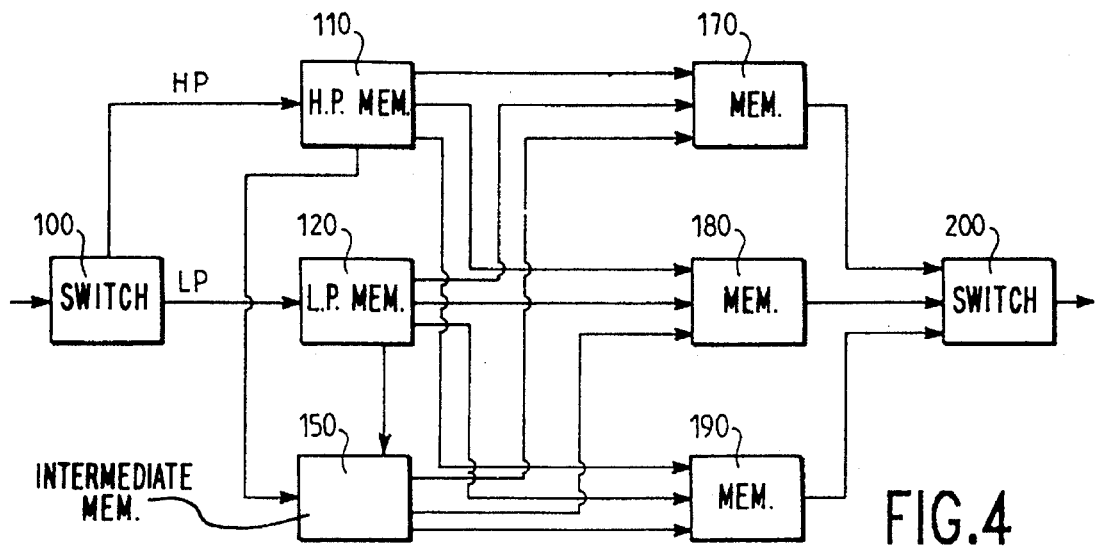
FIG. 4 shows an embodiment of an inverse processing device according to the invention, after transmission and/or storage and before decoding.

Inversely, when the digital signals first coded by variable length coding are subjected after this coding process to a direct treatment as effected by the device shown in FIG. 3, and when the signals thus treated have been transmitted and/or stored, their inverse treatment before the variable length decoding process is, for example, realised with the aid of a processing device as shown in FIG. 4.

In the case represented here by two information protection levels, this device comprises essentially a high-priority (HP) memory 110 and a low-priority (LP) memory 120 arranged in parallel and preceded by a circuit 100 for switching the transmitted and/or stored signals from the device of FIG. 4. The device also comprises a temporary memorization circuit which in this case is an intermediate memory 150 receiving the data from the memories HP110 and LP120 (it will hereinafter be seen which data are concerned) as well as first, second and third memories 170, 180, 190 for each type of data. These three parallel arranged memories are followed by a switch 200 which alternately selects one of their three outputs with a view to subsequent decoding of the stream of MPEG1 data thus reconstituted.

Like the decoding process, which is effected upstream of the processing device and operates on each section consecutively, the transmitted and/or stored signals from the processing device succeed each other section by section and thus comprise, for a given section in the present case:

(a) a synchronization word (referred to as start code SC) for each of the high-priority (HP) 110 and low-priority (LP) 120, the size of the information components corresponds to each section and the position of these subsequent synchronization words SC(HP) and SC(LP)—i.e. for the next section—is known and these words can thus be marked in the sequence of signals received by the device of FIG. 4);

(b) the numbers N(MBK), N(HHP), N(HLP), N(VHP), N(VLP), N(DHP), N(DLP), N(AHP), N(ALP) corresponding, in the case of the device of FIG. 3 to the number of macroblocks in the section and for the other numbers to the assignments of the bits to the HP and LP channels, which numbers express for each of these two channels the number of bits for the initial headers, the macroblock headers, the DC coefficients and the AC coefficients, respectively (it is evident that in accordance with the various situations described hereinbefore which may occur as a function of the allocation values, certain ones of these numbers may be zero, for example N(VLP) most frequently, because generally the macroblock headers are entirely transmitted in the HP channel):

(c) a header related to the MPEG1 standard;

(d) the bits corresponding to the rests, if present;

(e) the assembly of bits corresponding to the fixed-length units.

Figure 5:
FIGS. 5 to 12 show the contents of several memories in this inverse processing device.
Figure 6:
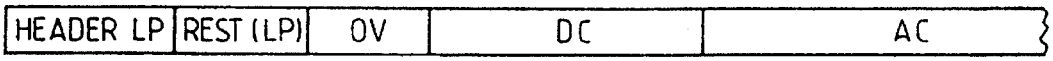

At the start of the inverse processing operation carried out by the device of FIG. 4 the information components transmitted in the HP and LP channels are applied to the memory 110 or the memory 120, respectively. FIGS. 5 and 6 show the contents of these memories.

As shown in FIG. 5, the memory 110 comprises under "header HP" the synchronization word HP and the indications of the numbers of bits corresponding, for the HP channel, to the different types of data: N(HHP), N(VHP), N(DHP), N(AHP) and subsequently all the bits corresponding to REST(HP) if this value is different from 0. The memory 110 subsequently comprises all the bits transmitted in the units and successively corresponding, for the HP channel, to the different types of data for the section concerned (i.e. the bits whose numbers successively are N(VHP), N(DHP), N(AHP)). This is followed successively by the assembly denoted OV of all the units corresponding to the macroblock headers, then by the assembly DC of all those corresponding to the DC coefficients and finally by the assembly AC of all those corresponding to the AC coefficients. Each unit contains, per transmitted block, the first bits of the block and the bits occupying the possible available gap and corresponding to information components of another block or other blocks. The position of the boundary between these two groups of bits depends on the distribution performed before transmission and/or storage.

Similarly, as shown in FIG. 6 the memory 120 comprises a first assembly of information components, viz. under "header LP" the synchronization word LP and all the numbers N(HLP), N(VLP), N(ALP) for the LP channel and subsequently all the corresponding bits REST(LP) if this value is different from 0. The memory 120 subsequently comprises all the bits transmitted in the units and corresponding successively (assemblies OV, DC, AC similar to the previous assemblies) for the channel LP to different types of data for the section concerned (i. e. the bits whose numbers are successively N(HLP), N(VLP), N(DLP), N(ALP)).

The assembly of bits corresponding, at the head of the memory 110 to the synchronization word SC(HP), to the indications N(. . .) of the numbers of bits corresponding to the different types of data and possibly to REST(HP), constitutes a section header HHP whose number of bits is expressed in N(HHP). Similarly, the assembly of bits corresponding to the synchronization word SC(LP) and possibly to REST(LP), constitutes a section header HLP whose number of bits is expressed in N(HLP). In the case of HP data transmitted to the memory 110, likewise as in the case of LP data transmitted to the memory 120, the numbers N(.) are transmitted as many times as is necessary, i.e. N(MBK) times for N(VHP) or N(VLP) because there are as many macroblock headers as there are macroblocks, and 6× N(MBK) times for N(DHP), N(AHP), N(DLP), N(ALP) because there are six blocks per macroblock.

The operation of the inverse processing device shown in FIG. 4 will now be evident by first describing in detail how the signals received by said device after their transmission and/or storage are switched to the memories 110 and 120, which constitutes the first phase of said operation.

The first switching stage marked by the indications 1 in FIGS. 5 and 6 consists of receiving the headers HP and LP and of switching header HP to the memory 110 (FIG. 5) and header LP to the memory 120 (FIG. 6). These headers are followed in the memory 110 by bits of REST(HP), if they exist, and in the memory 120 by bits corresponding to REST(LP), likewise if they exist. This second stage, denoted 2 in FIGS. 5 and 6, is followed by a third stage, denoted 3 in these Figures and which consists of writing in units HP and LP in the memories 110 and 120, respectively. High-priority data are thus successively written into the memory 110, subsequent to the bits of REST(HP), the contents of the units HP corresponding to the macroblock headers and subsequently those of the units HP corresponding to the DC coefficients and finally those of the units HP corresponding to the AC coefficients. Similarly, the low-priority data are successively written into the memory 120, subsequent to the bits of REST(LP), the contents of the units LP corresponding to the macroblock headers (if these units exist because we have seen that the macroblock headers are generally transmitted completely in the HP channel), subsequently those of the units LP corresponding to the DC coefficients and finally those of the units LP corresponding to the AC coefficients. The first phase of operation, viz. switching the data received by the device to the HP and LP memories is then accomplished.

The second phase of this operation consists of regrouping the data per type of data as defined in the hierarchy. This regrouping is realised in the memories 170, 180, 190 per type of data and with the aid of the intermediate memory 150. For the short blocks a space or gap remains available in the corresponding block for the leftover bits of the blocks which are too long. The intermediate memory 150 permits of retrieving these gaps after having determined their position in the memories 110 and 120. After these two memories have been read, the gaps which are temporarily stored in the memory 150 can be returned to the correct position for each block by reading this intermediate memory 150 and writing in the appropriate memory 170, 180, 190.

For this second phase of operation three situations should be distinguished: the situation where N(OVLP) is different from 0, which implies that N(DCHP) and N(ACHP) are equal to 0, then the situation where N(OVLP) is equal to 0 and N(DCLP) is different from 0, which implies that N(ACHP) is equal to 0, and finally the situation where N(OVLP) and N(DCLP) are both equal to 0. The contents of the intermediate memory 150, in which the HP dam and subsequently the LP dam are found in all cases, are constituted in a manner which differs in accordance with the one or the other of these three situations and is shown in three separate FIGS. 7 to 9.

Figure 7:
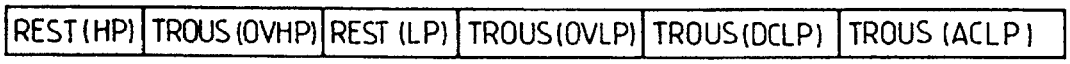

FIG. 7 corresponds to the first situation, i.e. the case where N(OVLP) is different from 0 and the corresponding data (macroblock headers) are not only transmitted in the AP channel but also in the LP channel for the leftover bits with respect to the HP allocation. In this case the intermediate memory 150 successively receives the following information components: REST(HP) read (if this value is different from 0) from the memory HP 110, and subsequently, among the bits of the units HP corresponding to the macroblock headers, all those (denoted TROUS(OVHP) globally) which correspond to the gaps and which are also read from the memory 110. When the data HP have been written in the memory 150 the dam LP (read from the memory 120) may subsequently be written, i.e. successively REST(LP), subsequently the leftover bits (denoted TROUS(OVLP)) corresponding to the macroblock headers and situated in the corresponding LP units, subsequently the bits denoted TROUS(DCLP) corresponding to the DC coefficients (transmitted within the LP allocation) and finally the bits denoted TROUS(ACLP) corresponding to the AC coefficients (also transmitted within the LP allocation).

Figure 8:
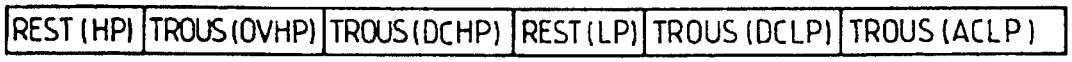

FIG. 8 similarly corresponds to the second situation, i.e. to the case where the DC coefficients are partially transmitted in the HP channel and partially in the LP channel. The following information components are successively written into memory 150: REST(HP) and TROUS(OVHP) likewise as hereinbefore, read from the memory 110 and subsequently, among the bits of the units HP corresponding to the DC coefficients, all those (denoted TROUS(DCHP) globally as hereinbefore) which correspond to the gaps (also read from the memory 110), subsequently, by reading from the memory 120, the information components REST(LP) (if they exist), TROUS(DCLP) (i.e. the leftover bits corresponding to the DC coefficients and situated in the corresponding LP units), and TROUS(ACLP) (i.e. the bits corresponding to the AC coefficients entirely transmitted within the LP allocation).

Figure 9:
Figure 10:
Figure 11:
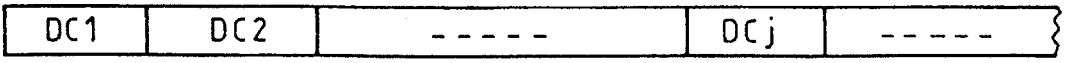
Figure 12:
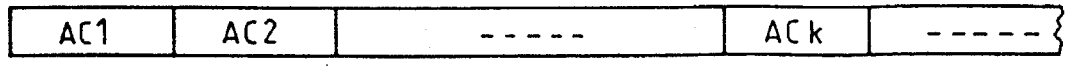

FIG. 9 corresponds to the third situation, i.e. to the case where the AC coefficients are partially transmitted in the HP channel and partially in the LP channel. The following information components are successively written into memory 150 and read from the memory 110: REST(HP), TROUS(OVHP), TROUS(DCHP), read from the memory 110 and subsequently, among the bits of the units HP corresponding to the AC coefficients, all those (denoted TROUS(ACHP) globally as hereinbefore) which correspond to the gaps (also read from the memory 110), and subsequently, by reading from the memory 120, the information components REST(LP), (if they exist) and TROUS(ACLP) (i.e. the leftover bits corresponding to the AC coefficients and situated in the corresponding units LP).

Once the assembly of gaps is stored in the intermediate memory 150, a coordinated reading from this memory and the memories 110 and 120 permits of regrouping the data of the same type (macroblock headers, DC coefficients, AC coefficients) in the memories 170 to 190, respectively. The bits of the start of the blocks are read from the memory HP110 and/or the memory LP120 and the gaps possibly completing these bits of the start of the blocks are read from the memory 150. When the assembly of bits corresponding to the macroblock headers (OV 1 for the first macroblock, OV2 for the second macroblock, ..., OVi for the $i^{th}$ macroblock, etc. . . .) are present in the memory 170, the assembly of bits corresponding to the DC coefficients (DC1, DC2, . . . , DCj, . . . etc. . . .) in the memory 180 and the assembly of bits corresponding to the AC coefficients (AC1, AC2, . . . , ACk, . . . etc. . . .) in the memory 190, the switch 200 alternately selects the appropriate output of the three outputs of the memories 170 to 190 and thus reconstitutes at its output the initial data stream MPEG1 by reading per macroblock and a macroblock header as many times as there are macroblocks in the section and six times (one per block) a DC information component and an AC information component.

With a view to their being written into the intermediate memory 150, the gaps are read from the memories 110 and 120 by first defining an initial read address ADR.R.INIT for the first gap of each memory 110 or 120. This address can be determined because the number of bits preceding it is given by N(HHP) for the memory 110 and by N(HLP) for the memory 120 when gaps are concerned which relate to the macroblock headers. For the two initial addresses concerning the gaps relating to the DC coefficients, the number of bits preceding these addresses is given by N(HHP)+ N(MBK) times the length of the unit HP "macroblock headers" for the memory HP 110, and by N(HLP)+N(MBK) times the length of the unit LP "macroblock headers" for the memory LP120, while for the two initial addresses concerning the AC coefficients the number of bits which precede these addresses is given by N(HHP)+N(MBK) times the length of the unit HP "macroblock headers" +6N(MBK) times the length of the unit HP "DC coefficients" for the memory HP110, and by N(HLP)+N(MBK) times the length of the unit LP "macroblock headers" +6N(MBK) times the length of the unit LP "DC coefficients" for the memory LP120. In all cases this initial address yields the address of the start of the first unit for the type of data considered and, for obtaining the read address of the first corresponding gap, the bits which do not correspond to the gaps should be read first in order to determine their length and to extend this length so that it is at the level of the first bit of each gap (if it exists in the unit considered). By proceeding in this way for all the units, and subsequently by renewing this process for each type of data, the bits corresponding to TROUS(OVHP), TROUS(DCHP) or TROUS(ACHP) can be transferred in accordance with the type of data from the memory HP110 to the intermediate memory 150 and subsequently, just after this transfer, the bits corresponding to TROUS(OVLP), TROUS(DCLP) or TROUS(ACLP) can be similarly transferred in accordance with the type of data from the memory LP120 to the memory 150.

It should be noted that the invention is not limited to the embodiments described and modifications based on these embodiments may be proposed without departing from the scope of the invention.

Particularly by describing, with reference to the direct treatment, the redistribution of bits of each section for an optimal filling of the packets and the tests to be effected prior to such a redistribution for taking the various situations which may occur as a function of the allocation values into account, we have seen that in the first three situations of the four situations mentioned the divisions contributing to the determination of the units HP and LP associated with each type of variable length data may have rests which correspond to leftover bits. These leftover bits are not included in any of the units defined so far and the units HP and LP have been redefined for them. The unit HP is determined by subtracting the number of bits corresponding to all the units HP already defined from the global allocation HP (and also the number of bits corresponding to the section header) and the unit LP is calculated similarly by subtraction of the number of bits corresponding to all the already existing units LP from the global allocation LP. These calculations are effected, as hereinbefore, in the control circuit 30 for redistributing the bits in which they constitute a supplementary stage of the process of redistribution.

In order that the whole image or the whole group of images need not be stored in the addressable memory 40, i.e. so as to reduce the volume of this memory, it is possible to use for the whole image or the whole group of images a recursive process with which the counts for the image or the previous group of images can be validated. It is then sufficient to store only the bit stream corresponding to the coding of a single section in the addressable memory 40 and the capacity of this memory may thus be smaller than in the previous case. For the first image or for the first group of images the use of previous counts is of course not possible and the allocations HP and LP are thus fixed at the same value for each section, which value is equal to said determined global proportion (30% and 70%, respectively, in the example described).

If a direct treatment is concerned, such as the treatment carried out with reference to the embodiment shown in FIG. 3, or if an inverse treatment is concerned such as the one carded out with reference to the embodiment of FIG. 4, it will be evident that the values of the number of priority levels (two in this case: the levels HP and LP) and the number of types of data which may be arranged in accordance with a given hierarchy (three in this case: the macroblock headers, the DC coefficients, the AC coefficients) do not constitute a limitation of the invention. For these numbers of levels and data types, referred to as N and M, respectively, the example described, in which N= 2 and M=3, only corresponds to a particular realisation in the case of a data stream of the MPEG type.

We claim:

1. A device for processing a digital signal for transmission and/or storage, which signal consists of a stream of data bits representing a sequence of video images and which is coded, at least in part, in accordance with a variable length coding algorithm; each image having a plurality of image sections, each image section being represented in said signal by a sub-assembly of blocks of data bits preceded by a synchronizing signal, the data bits in each block representing one or more of a predetermined number M ($\mu \geq 2$) of types of data having relative priorities in accordance with a predetermined hierarchy; said device comprising:

(a) an addressable memory for receiving and storing the data bits of said signal;

(b) a counting circuit for also receiving the data bits of said signal and determining therefrom for each image section the numbers of data bits for each of said types of data;

(c) a bit allocation circuit coupled to said counting circuit for assigning to each image section for each type of data channel bit allocations for transmission and/or storage of data bits via a plurality N ($N \geq 2$) of channels of different priorities, the channel bit allocations being proportioned with reference to a group of said video images;

(d) a bit redistribution circuit coupled to said memory, to said counting circuit and to said bit allocation circuit, for controlling redistribution of the data bits applicable to each image section among said channels in accordance with the following criteria:

(i) as a function of the channel bit allocations assigned to said image section for the channel of highest priority (HP), assigning to said HP channel in descending hierarchal order all data bits applicable to said image section which can be entirely included in said HP allocations;

(ii) as a function of the channel bit allocations assigned to said image section for the channel of lowest priority (LP), assigning to said LP channel in ascending hierarchal order all data bits applicable to said image section which can be entirely included in said LP allocations;

(iii) for the data bits so assigned, and the sub-assembly of data blocks applicable to said image section, calculating in numbers of bits an average length per block which defines a specific unit length of a transmission packet for each of said types of data;

(iv) for a type of data which cannot be exclusively assigned to either of the HP and LP channels, assigning to the HP channel those bits of such data relating to said image section which can be included in the HP channel according to an equal distribution of such data bits for all image sections, followed by a subsequent complementary assignment of any leftover bits of such data in data blocks in the LP channel;

(v) for the type of data in (iv), calculating in numbers of bits an average length per block which defines a specific unit length of a transmission packet for such data; supplying said unit length and the assignment information in (iv) to said addressable memory for read-out of such data; and for each channel and each transmission packet of such data having said specific unit length, locating at least the first bits relating to the relevant hierarchal data type in each packet and any leftover bits of other data blocks in complementary locations.

2. A device as claimed in claim 1, wherein said number M of categories of data is three, and said number N of channels is two.

3. A device as claimed in claim 1, wherein said redistribution circuit comprises a circuit for calculating in numbers of bits an average length per block which defines a specific unit length of a transmission packet per channel for assembly of said leftover bits, and supplying said specific unit length of the transmission packet per channel to said addressable memory.

4. A device as claimed in claim 1, wherein said addressable memory has a capacity sufficient for storing the group of images with respect to which said predetermined relative proportions of channel bit allocations have been determined.

5. A device as claimed in claim 1, wherein said addressable memory has a capacity sufficient for storing at least one image section, and the counts of the number of bits corresponding to each of said types of data are the same for all except the first of the group of images with respect to which said predetermined relative proportions of channel bit allocations have been determined.

6. A device as claimed in claim 5, wherein said number M of types of data is three, and said number N of channels of different priorities is two.

7. A device for recovering a digital signal following transmission and/or storage thereof, and which prior to said transmission and/or storage has been subjected to reorganization of the data bits thereof; said signal consisting of a stream of data bits representing a sequence of video images and which is coded, at least in part, in accordance with a variable length coding algorithm; each image having a plurality of image sections, each image section being represented in said signal by a sub-assembly of blocks of data bits preceded by a synchronizing signal, the data bits in each block representing one or more of a predetermined number M ($M \geq 2$) of types of data having relative priorities in accordance with a predetermined hierarchy; the reorganization of the data bits thereof having been effected as follows:

(i) for each image section, assigning allocations of numbers of bits for transmission in each of a number N of channels of different priorities, where $N \geq 2$;

(ii) redistributing the bits of each image section to form transmission packets of equal length for each of said types of data; and (iii) reassigning, in gaps left available in packets which exceed the length of an image block, leftover bits from packets which are shorter than the length of an image block;

said device comprising:

(a) a switching circuit for switching the reorganized digital signal to a plurality of parallel outputs of said switching circuit, said plurality being equal to said number N of channels of different priorities;

(b) a plurality N of data memories respectively coupled to the N outputs of said switching circuit;

(c) an intermediate memory for storing the leftover bits included in said gaps;

(d) a plurality M of memories respectively corresponding to said M types of data, connected to each of said number N data memories and to said intermediate memory; and (e) at the M outputs of said M memories, a switch for cyclically selecting one of said outputs to thereby recover said data signal restored to the form thereof prior to reorganization of the data bits.

* * * * *